(12) United States Patent  
Barber et al.

(10) Patent No.: US 7,399,949 B2
(45) Date of Patent: *Jul. 15, 2008

(54) METHOD AND APPARATUS FOR ATTACHING A MEMBRANE ROOF USING INDUCTION HEATING OF A SUSCEPTOR

(75) Inventors: John P. Barber, Dayton, OH (US); Robert C. Cravens, II, Beavercreek, OH (US); Antonios Challita, Bellbrook, OH (US); Susan A. Stanton, Sunbury, OH (US)

(73) Assignee: Nexicor LLC, Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/093,767

(22) Filed: Mar. 30, 2005

(65) Prior Publication Data

US 2006/0237448 A1 Oct. 26, 2006

(51) Int. Cl.
*H05B 6/12* (2006.01)
(52) U.S. Cl. .................. 219/621; 219/622
(58) Field of Classification Search ............ 219/621, 219/622, 623, 624, 625, 626, 627; 156/359; *A05B 6/12*
See application file for complete search history.

(56) References Cited

U.S. PATENT DOCUMENTS

| | | | | |
|---|---|---|---|---|
| 4,546,589 A | * | 10/1985 | Seaman | 52/518 |
| 4,743,332 A | * | 5/1988 | Black | 156/359 |
| 4,841,706 A | | 6/1989 | Resan | |
| 4,894,112 A | * | 1/1990 | Lippman | 156/308.4 |
| 4,913,772 A | * | 4/1990 | Taylor et al. | 156/499 |
| 5,486,205 A | * | 1/1996 | Cornell et al. | 607/104 |
| 5,624,511 A | * | 4/1997 | Lippman | 156/64 |
| 6,023,906 A | * | 2/2000 | Folkersen | 52/746.11 |
| 6,229,127 B1 | * | 5/2001 | Link | 219/635 |
| 6,238,502 B1 | * | 5/2001 | Hubbard | 156/71 |
| 6,536,498 B1 | * | 3/2003 | Srinivasan et al. | 156/497 |
| 6,588,475 B1 | * | 7/2003 | Simon et al. | 156/359 |
| 2003/0164367 A1 | * | 9/2003 | Bucher et al. | 219/479 |
| 2004/0048537 A1 | | 3/2004 | Holzer et al. | |
| 2004/0140304 A1 | * | 7/2004 | Leyendecker | 219/386 |

FOREIGN PATENT DOCUMENTS

| | | |
|---|---|---|
| EP | 0 735 210 A | 10/1996 |
| EP | 0 884 609 A1 | 12/1998 |
| GB | 2 325 982 A | 12/1998 |
| JP | 1200937 A2 | 8/1989 |
| WO | WO 2006/104740 A | 10/2006 |

* cited by examiner

*Primary Examiner*—Daniel Robinson
(74) *Attorney, Agent, or Firm*—Frederick H. Gribbell

(57) ABSTRACT

An improved induction heating apparatus is provided for attaching membrane roofs. A top membrane layer is attached to attachment disks that hold sheets of thermal insulation to the top of roof substrates. The heating apparatus emits a magnetic field that raises the temperature of the disks and a heat-activated adhesive on top of the disks which, after cooling, becomes adhered to the bottom surface of the top membrane layer. The disks in turn are attached via fasteners to the substrate portion of the roof structure. The apparatus includes a set of bottom guides that allow a user to find the attachment disks mechanically, without actually seeing those disks beneath the top membrane layer. A fine locator circuit is provided, using a magnetic field, and the apparatus allows a user to stand upright while operating the apparatus.

13 Claims, 11 Drawing Sheets

METHOD AND APPARATUS FOR ATTACHING A MEMBRANE ROOF USING INDUCTION HEATING OF A SUSCEPTOR

TECHNICAL FIELD

The present invention relates generally to induction heating equipment and is particularly directed to an induction heating apparatus of the type which attaches membrane roofs. The invention is specifically disclosed as a method and apparatus used to attach a top membrane layer to attachment disks that hold sheets of thermal insulation to the top of roof structures. The apparatus includes a self-contained power supply and a controller that provides alternating current of an appropriate frequency to an induction "work" coil that emits a magnetic field, which is used to induce eddy currents in the metal attachment disks, thereby raising the temperature of those disks. The upper surface of the disks have a heat-activated adhesive that becomes adhered (by heating the disks) to the bottom surface of the top membrane layer, and after being allowed to cool, then attaches the top membrane layer to the disks, which in turn are attached via fasteners to the substrate portion of the roof structure. The apparatus includes a set of bottom guides that allow a user to find the attachment disks mechanically, without actually seeing those disks, which are beneath the top membrane layer. The apparatus allows a user to stand upright while operating the apparatus. In addition, the apparatus provides an electrical locator circuit that magnetically locates the attachment disks; using a low energy mode, the induction work coil emits a magnetic field, and if a disk is nearby, the work coil is magnetically loaded. The work coil is centertapped, and if the disk is positioned substantially at the center of the work coil, then both halves of the centertapped work coil will be substantially equally loaded, and will exhibit substantially equal impedance. A Wheatstone bridge circuit detects the state of the "balance" the work coil's impedance; if the circuit is substantially balanced, that is an indication that the work coil is presently positioned in a proper location to effectively heat the attachment disk.

BACKGROUND OF THE INVENTION

Induction heating devices have been available for use with membrane roofs in the past. One such device is described in U.S. Pat. No. 6,229,127. The induction heating device in this patent used four sensing coils with indicators to help the user find the correct position of the induction tool over one of the attachment disks that is to be heated by the induction coil of the tool. This conventional tool was fairly small in height, and the user had to generally be in a kneeling position to use it.

SUMMARY OF THE INVENTION

Accordingly, it is an advantage of the present invention to provide an induction heating tool used for membrane roofing in which the user can remain in a standing or walking position at all times while properly positioning the induction heating tool over one of the attachment disks.

It is another advantage of the present invention to provide an induction heating tool that is used to adhere an attachment disk to a membrane layer of a membrane roof structure, in which the induction heating tool provides a mechanical guide to readily allow the user to locate the attachment disks beneath the membrane layer.

It is yet another advantage of the present invention to provide an induction heating tool for use with a membrane roof in which the tool has an induction heating coil of a size and shape to allow a user to have significant tolerance in one direction, while having a more narrow tolerance in a different, perpendicular direction while still being able to sufficiently heat one of the attachment disks positioned beneath the membrane layer.

It is a further advantage of the present invention to provide an induction heating tool in which the user can quickly locate one of the attachment disks beneath a membrane layer by a mechanical guide structure, and then to use an electrical circuit to more accurately position the induction coil over one of the attachment disks.

It is a still further advantage of the present invention to provide an induction heating tool for use on a membrane roof, in which an electrical sensing circuit is provided with an indicator device to allow a user to substantially accurately locate an attachment disk to be heated, while the user remains in a standing or walking position.

It is still a further advantage of the present invention to provide an induction heating tool for use on a membrane roof in which the induction heating tool is air-cooled by liberal use of heat sink elements, including multiple heat sink elements on the base structure of the tool which also contains the induction heating coil.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for operating an induction heating apparatus is provided, in which the method comprises the following steps: (a) providing a unitary induction heating apparatus, which comprises: (i) an electrical power supply, (ii) a controller, (iii) an induction coil, and (iv) a base portion which includes a mechanical guide structure; (b) placing the induction heating apparatus atop a membrane roof structure under construction, the membrane roof structure including a lower substrate, a plurality of thermally insulative members, a plurality of attachment members, and an upper membrane structure, wherein: (i) the plurality of attachment members are at least partially electrically conductive, and (ii) a layer of thermally-activated adhesive material is affixed to an upper surface of the plurality of attachment members; (c) placing a fastener portion of the plurality of attachment members through the plurality of thermally insulative members, and into the lower substrate, thereby attaching the plurality of thermally insulative members to the lower substrate; (d) placing the upper membrane structure atop the plurality of thermally insulative members, and atop the plurality of attachment members; (e) placing the base portion of the induction heating apparatus above the membrane surface, and mechanically locating at least one of the plurality of attachment members using the mechanical guide structure of the base portion, while a user of the induction heating apparatus operates in a standing position; and (f) energizing the electrical power supply and the induction coil, thereby emitting a magnetic field from the induction coil, raising a temperature of at least one of the plurality of attachment members, and thereby raising a temperature of the thermally-activated adhesive material such that the thermally-activated adhesive material adheres to a bottom surface of the upper membrane structure, while the user of the induction heating apparatus remains in a standing position.

In accordance with another aspect of the present invention, an induction heating apparatus is provided, which comprises: (a) a lower base portion, (b) an upper handle portion, and (c)

a body portion located therebetween; (d) an electrical power supply and a controller; (e) a manually-operable actuation device located in the handle portion; (f) an induction coil located in the base portion; and (g) a mechanical guide structure located along a bottom surface of the base portion, the mechanical guide structure being of a size and shape to assist in positioning the induction heating apparatus proximal to an attachment member used in a membrane roof structure.

In accordance with yet another aspect of the present invention, an induction heating apparatus is provided, which comprises: (a) a lower base portion, (b) an upper handle portion, and (c) a body portion located therebetween; (d) an electrical power supply and a controller; (e) a manually-operable actuation device located in the handle portion; (f) an induction coil located in the base portion; and (g) a plurality of heat sink elements located on a surface of the base portion.

In accordance with still another aspect of the present invention, an induction heating apparatus is provided, which comprises: (a) a lower base portion, (b) an upper handle portion, and (c) a body portion located therebetween; (d) an electrical power supply and a controller; (e) a manually-operable actuation device located in the handle portion; and (f) an induction coil located in the base portion; wherein: (g) the induction coil is of a shape having: (i) a first dimension in a longitudinal direction and (ii) a second dimension in a transverse direction that is substantially perpendicular to the longitudinal direction, the first dimension being substantially larger than the second dimension; (h) the induction coil emits a magnetic field that raises a temperature of an electrically conductive susceptor when the susceptor is positioned proximal to the base portion; and (i) the susceptor will be appropriately heated when it is positioned in a predetermined range of two-dimensional locations with respect to the base portion, in which the predetermined range of two-dimensional locations has a first tolerance distance in the longitudinal direction and a second tolerance distance in the transverse direction, and wherein the first tolerance distance is substantially greater than the second tolerance distance.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
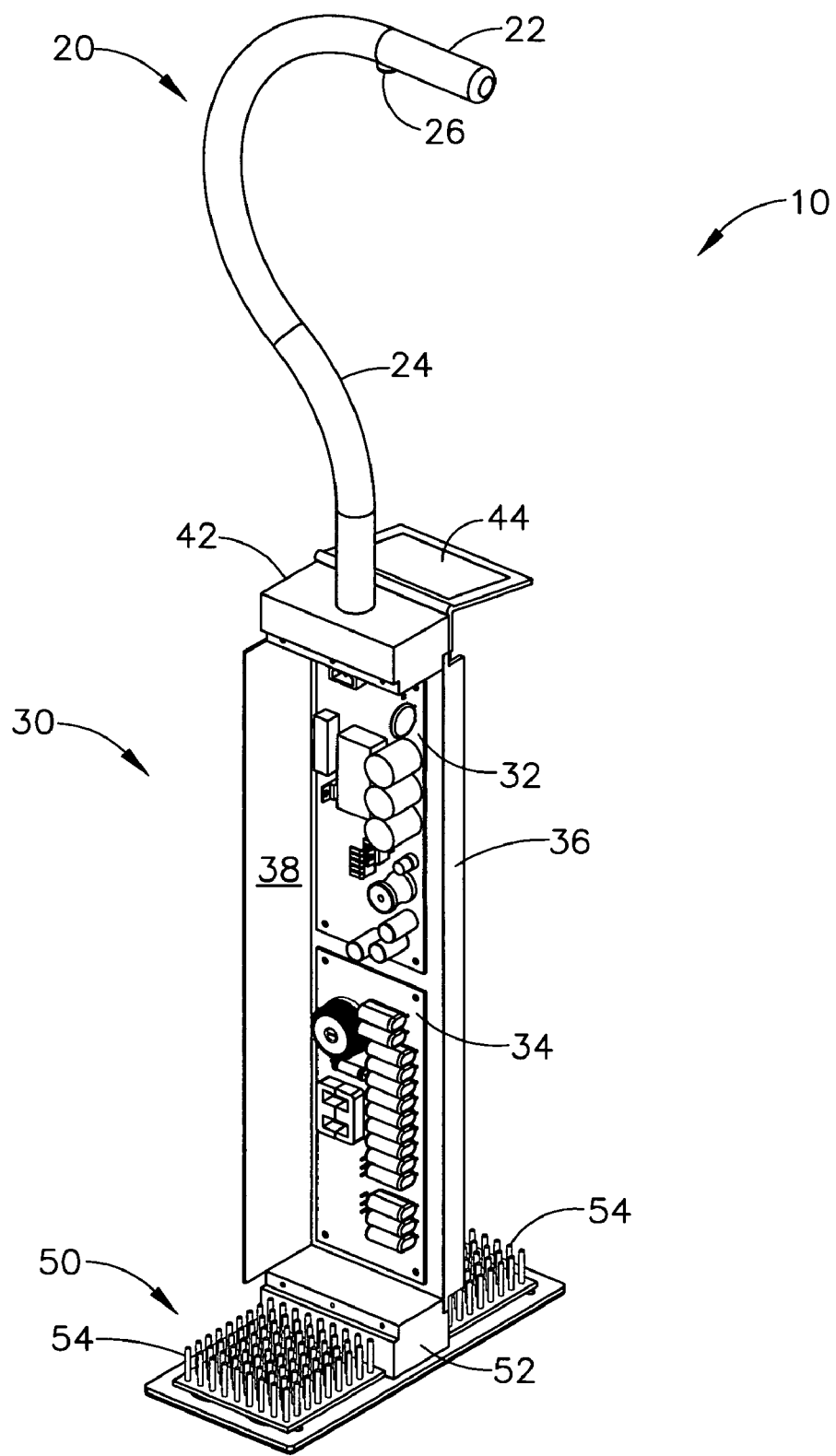
FIG. 1 is a perspective view from above showing an induction heating tool for use with membrane roofing, according to the principles of the present invention.

Referring now to FIG. 1, an induction heating tool generally designated by the reference numeral 10 is illustrated, having a handle portion 20, a main body portion 30, and a base portion 50. Induction tool 10 is made to be portable, and is generally used in an upright position, in which the base portion 50 is the lowermost portion, and the handle portion 20 is the uppermost portion. The middle or body portion 30 contains several electrical components, typically including a controller and power supply. In general, the type of controller and power supply that would be suitable for the induction tool 10 are described in U.S. Pat. No. 6,509,555.

Handle portion 20 includes a curved elongated portion 24, a top gripable portion 22, and an actuation button 26. In general, the actuation button 26 would consist of an electrical switch, or some other type of structure that will provide an "on" or "start" signal to the controller that resides in the body portion 30.

The body portion 30 includes a power supply mounted on a printed circuit board 32 and a work coil drive or interface circuit mounted on a printed circuit board 34, in which the components of these two circuit boards 32 and 34 are typically electrically connected to one another, as needed. The power supply PC board 32 may have a microprocessor or microcontroller mounted thereon, or such a microprocessor or microcontroller could be mounted to the work coil interface PC board 34, if desired. A source of electrical power would be needed, and could be in the form of an electrical connector or a built-in umbilical cord (not shown on FIG. 1), or perhaps a battery pack could be installed on the tool, if desired. In this upright position as illustrated on FIG. 1, a vertical support rail 36 provides a surface for mounting the two circuit boards 32 and 34. A vertical panel or housing cover 38 is also illustrated in FIG. 1, and will be seen on some of the other figures described below.

The handle portion 20 is connected into a mounting structure 42, which is part of the middle or body portion 30. A cover 44 is also provided. The cover 44 can be hinged or otherwise pivotable, and can be positioned over a mounting hole in the mounting structure 42 to keep the central or body portion 30 relatively dust-tight when the handle portion 20 has been withdrawn or disconnected.

Base portion 50 includes a center mounting structure 52 that includes electrical conductors and other mounting hardware to support an induction coil 68 that is not visible on FIG. 1. This induction coil 68 is the main "work coil" that emits a magnetic field for heating spaced-apart objects when the tool 10 is utilized. Base portion 50 also includes a number of heat sink elements 54 which, in the illustrated embodiment of FIG. 1, comprise multiple pin heat sinks that are mounted in a vertical direction. Since the work coil tends to produce large amounts of thermal energy, the numerous heat sink elements 54 are arranged to as to remove that thermal energy from the base portion 50 as efficiently as possible, for example, by being mounted very close in proximity to the work coil that is producing this thermal energy.

Figure 2:
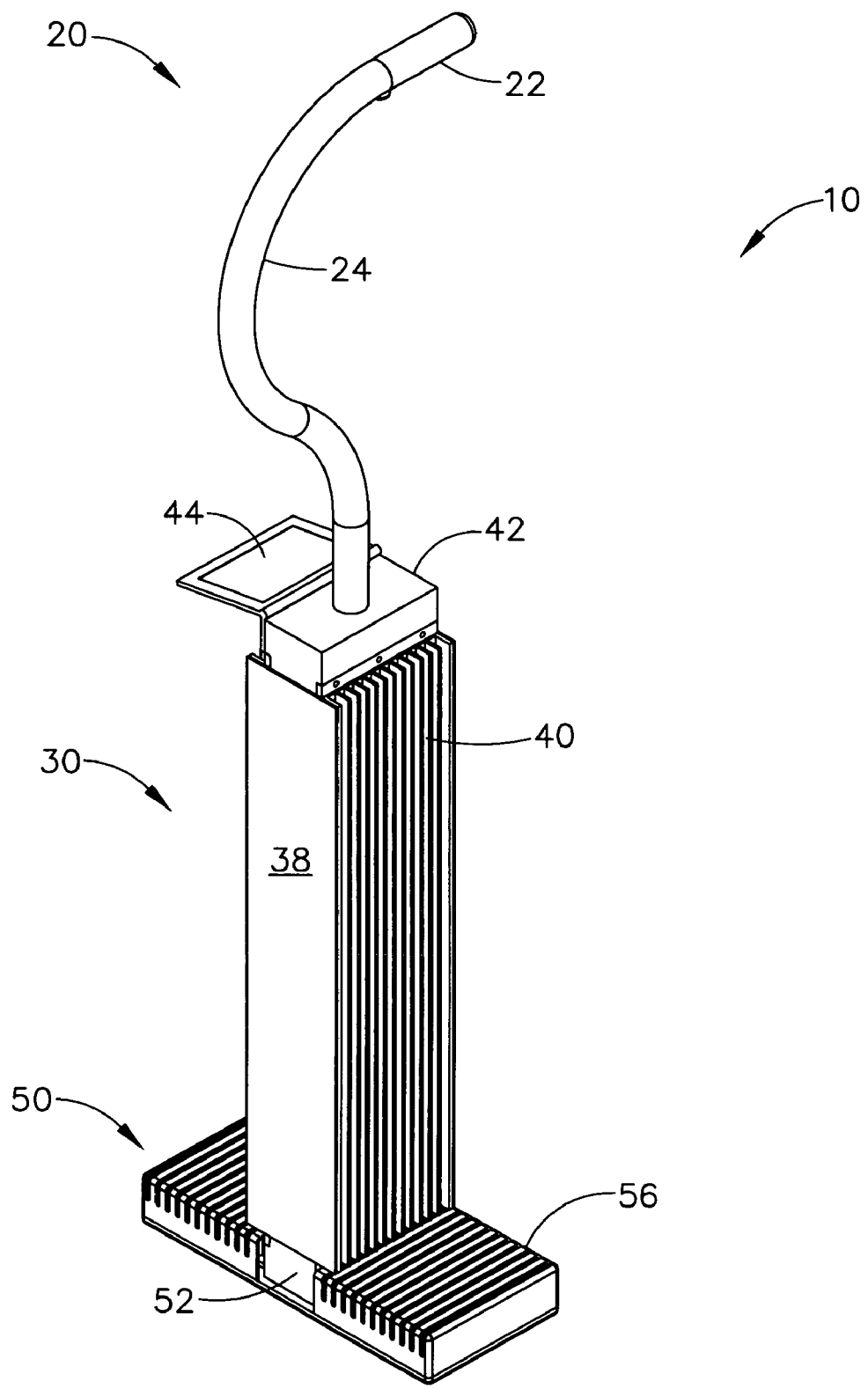
FIG. 2 is a perspective view of the tool of FIG. 1, showing the side covers and the top covers of the base portion of the tool.

Referring now to FIG. 2, the induction heating tool 10 is again illustrated in a perspective view in its upright position. In FIG. 2, a set of side covers have been installed on the center or body portion 30, in which one of the side covers is generally designated by the reference numeral 40. Another set of covers at 56 have been installed on the upper portions of the base portion 50. The covers 40 and 56 have spaced-apart openings or slots to allow air to be exchanged between the electrical components of the tool 10 and the ambient atmosphere around the tool. This allows for superior thermal cooling when the tool is being used.

Figure 3:
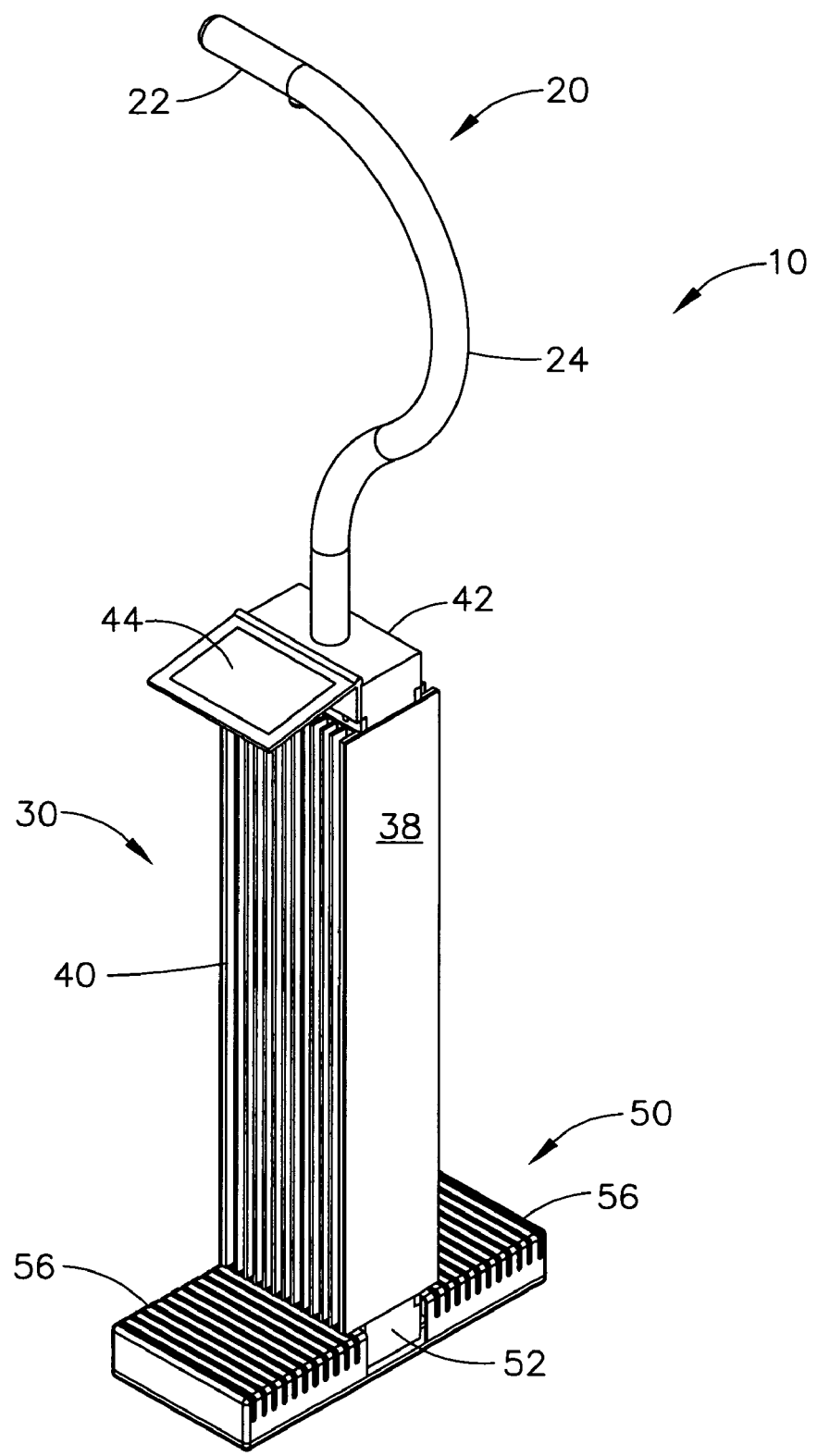
FIG. 3 is another perspective view of the tool of FIG. 1 from a different angle.

FIG. 3 is another perspective view of the tool 10 with its side cover 40 and top covers 56 mounted thereon. If desired, the side covers 40 can also comprise multiple fin heat sinks on either side of the vertical cover 38. This arrangement can provide additional cooling, if desired.

Figure 4:
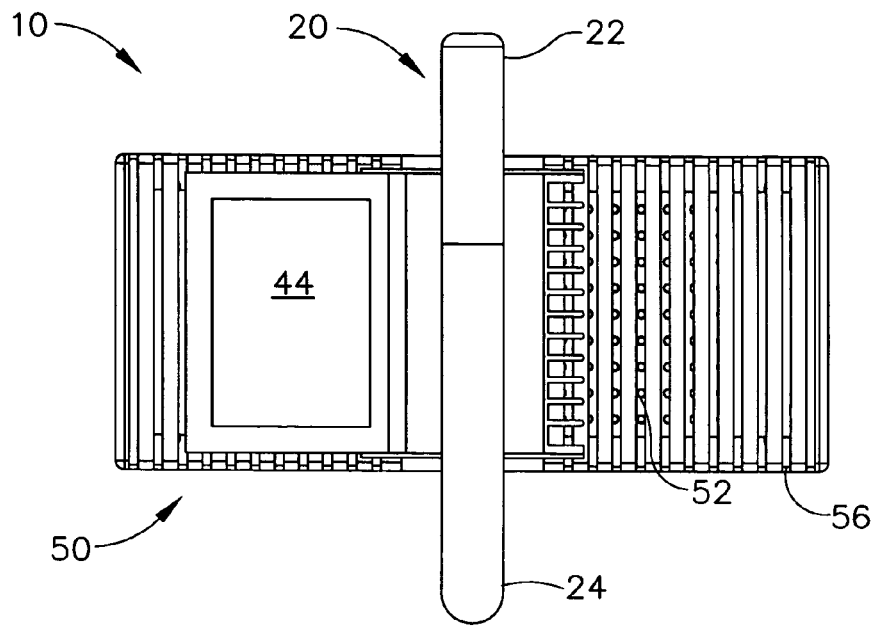
FIG. 4 is a top plan view of the induction heating tool of FIG. 1.

Referring now to FIG. 4, the tool 10 is viewed from above, and the handle elongated portion 24 and the gripable portion 22 are visible. The base portion 50 is visible, and the slots in the upper covers 56 are visible, as well as some of the pin heat sinks 52 between the openings in the slotted top cover 56.

Figure 5:
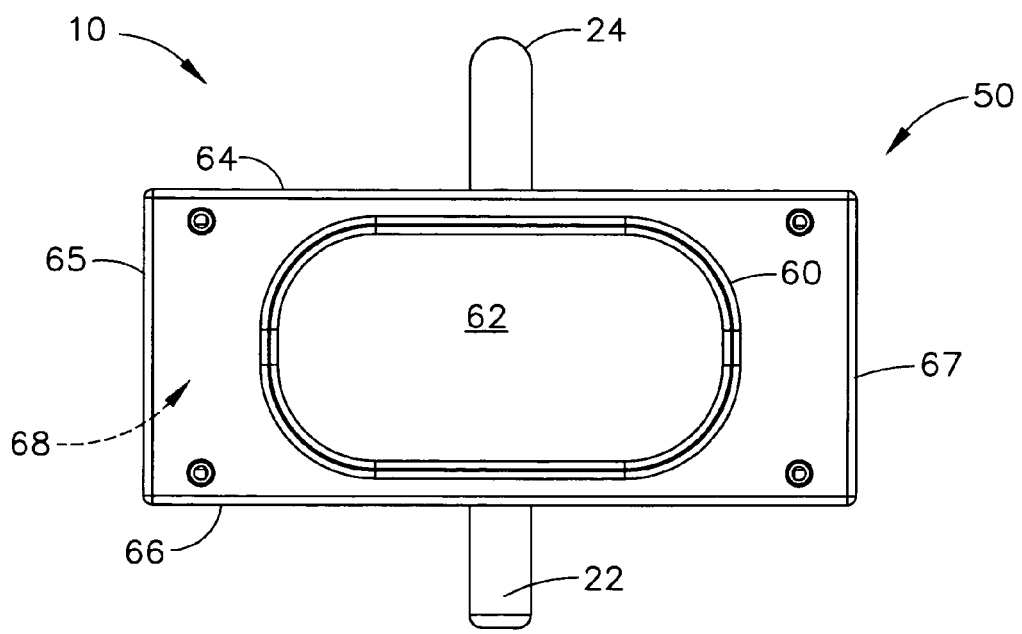
FIG. 5 is a bottom plan view of the induction heating tool of FIG. 1.

Referring now to FIG. 5, the base portion 50 is viewed from below, in which the induction heating coil 68 is depicted in dashed lines, since it is hidden by a bottom planar cover 62. Outer longitudinal edges at 64 and 66 are visible. An oval guide structure or "rail" 60 protrudes from the bottom of the planar cover 62 of the base portion 50. If desired, the guide 60 could run the entire longitudinal length of the base portion 50, or it could run only a portion of the distance from one end to the other along the longitudinal dimension of the base portion 50, as depicted in FIG. 5. Outer transverse edges are depicted at 65 and 67.

The guide structure 60 is provided to assist a user in locating one of a plurality of attachment disks that are used in membrane roof structures. This type of roof structure will be described below, mainly with reference to FIGS. 9 and 10. The guide structures 60 is sometimes referred to herein as a "runner" or "rail."

Figure 6:
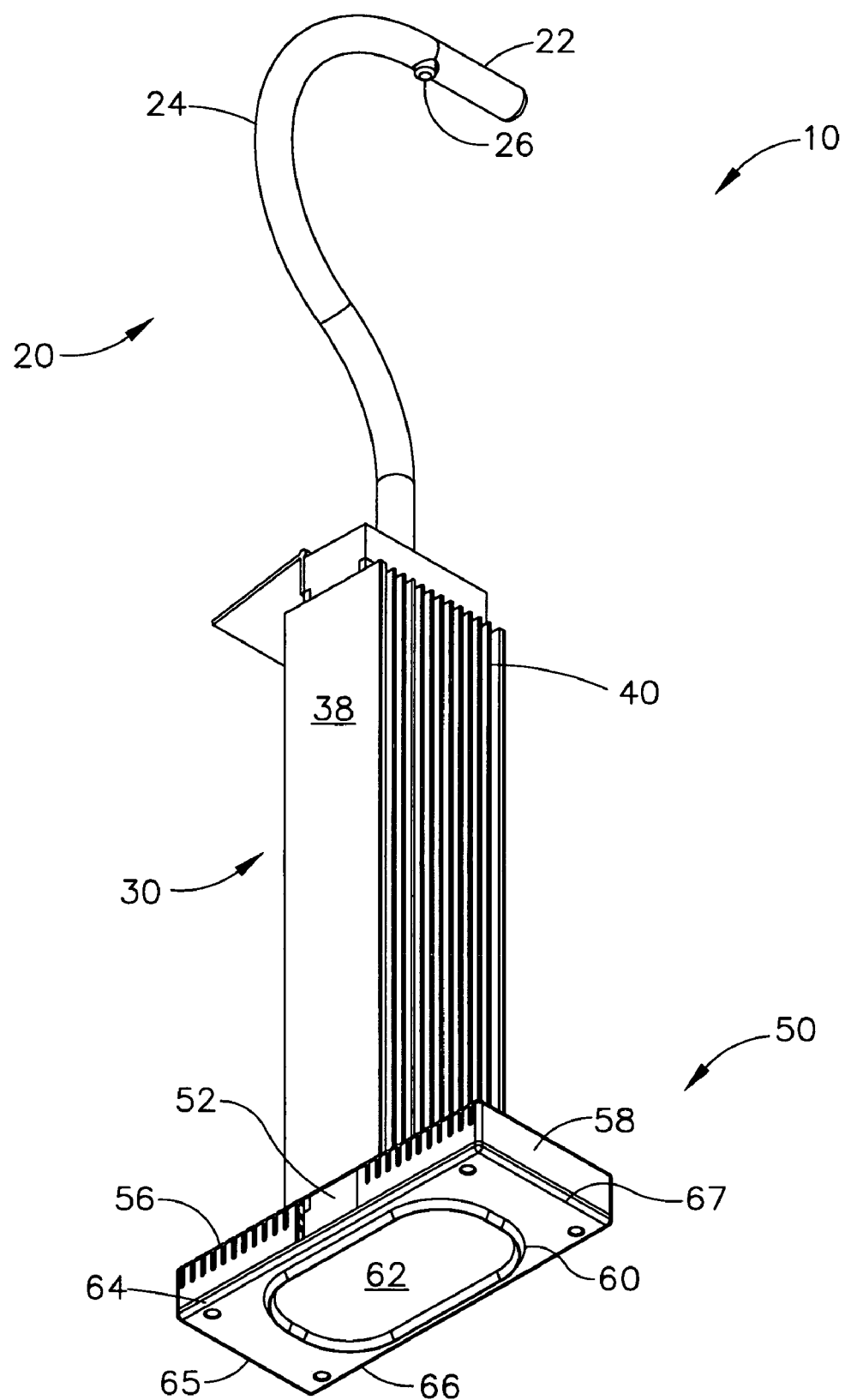
FIG. 6 is a perspective view of the induction heating tool of FIG. 1, showing the tool from a bottom angle and showing details of the bottom portions of the base.
Figure 7:
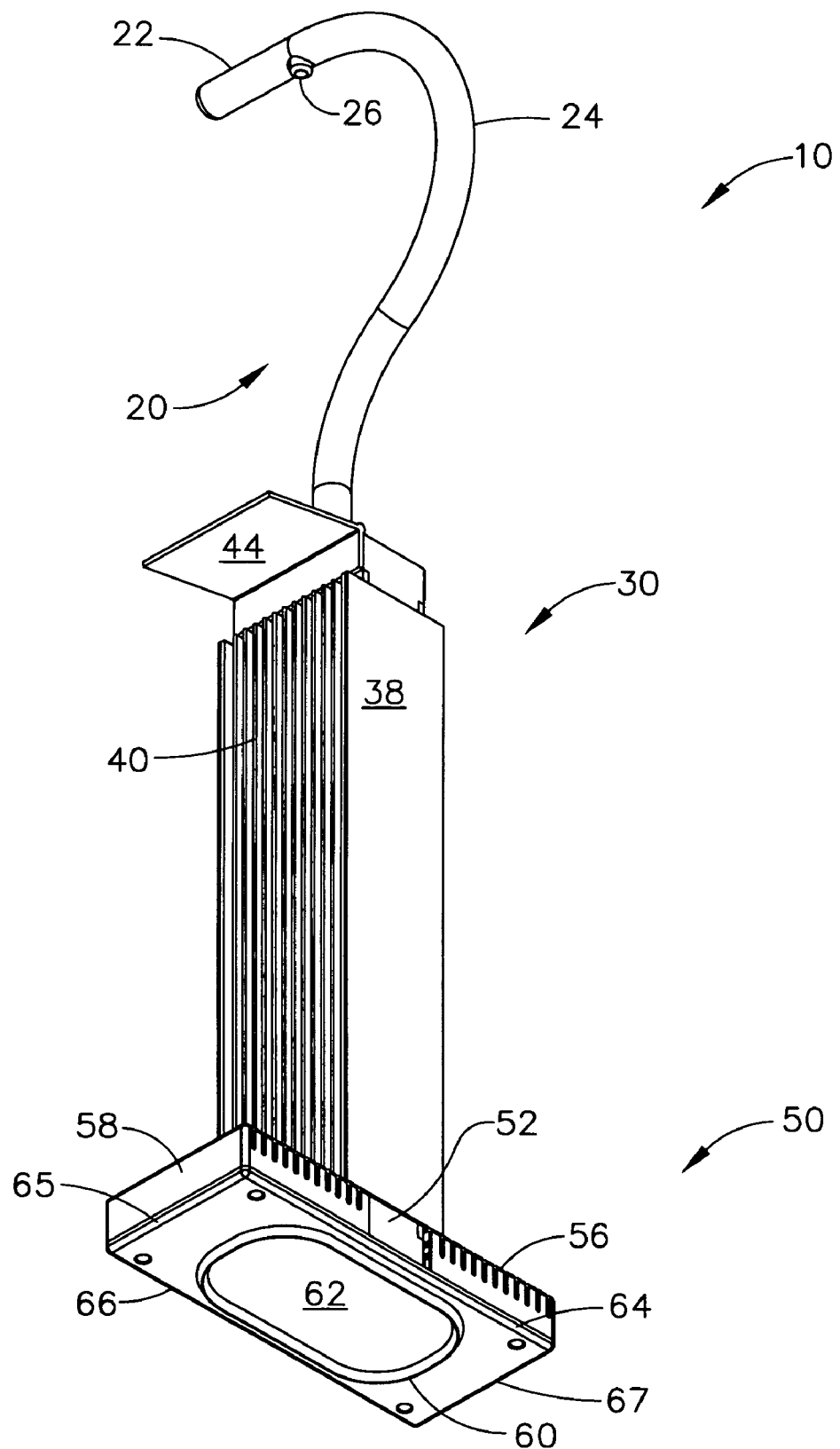
FIG. 7 is another bottom perspective view similar to that of FIG. 6.

Referring now to FIGS. 6 and 7, the induction heating tool 10 is illustrated in two perspective views from below at different angles. In both FIGS. 6 and 7, the actuation button or switch 26 is visible, as protruding from the bottom of the handle portion 20, near the gripable area 22. Also visible on FIGS. 6 and 7 is the protruding guide structure 60 in the bottom of the base portion 50. The transverse side covers of the base portion 50 are illustrated at the reference numeral 58.

Figure 8:
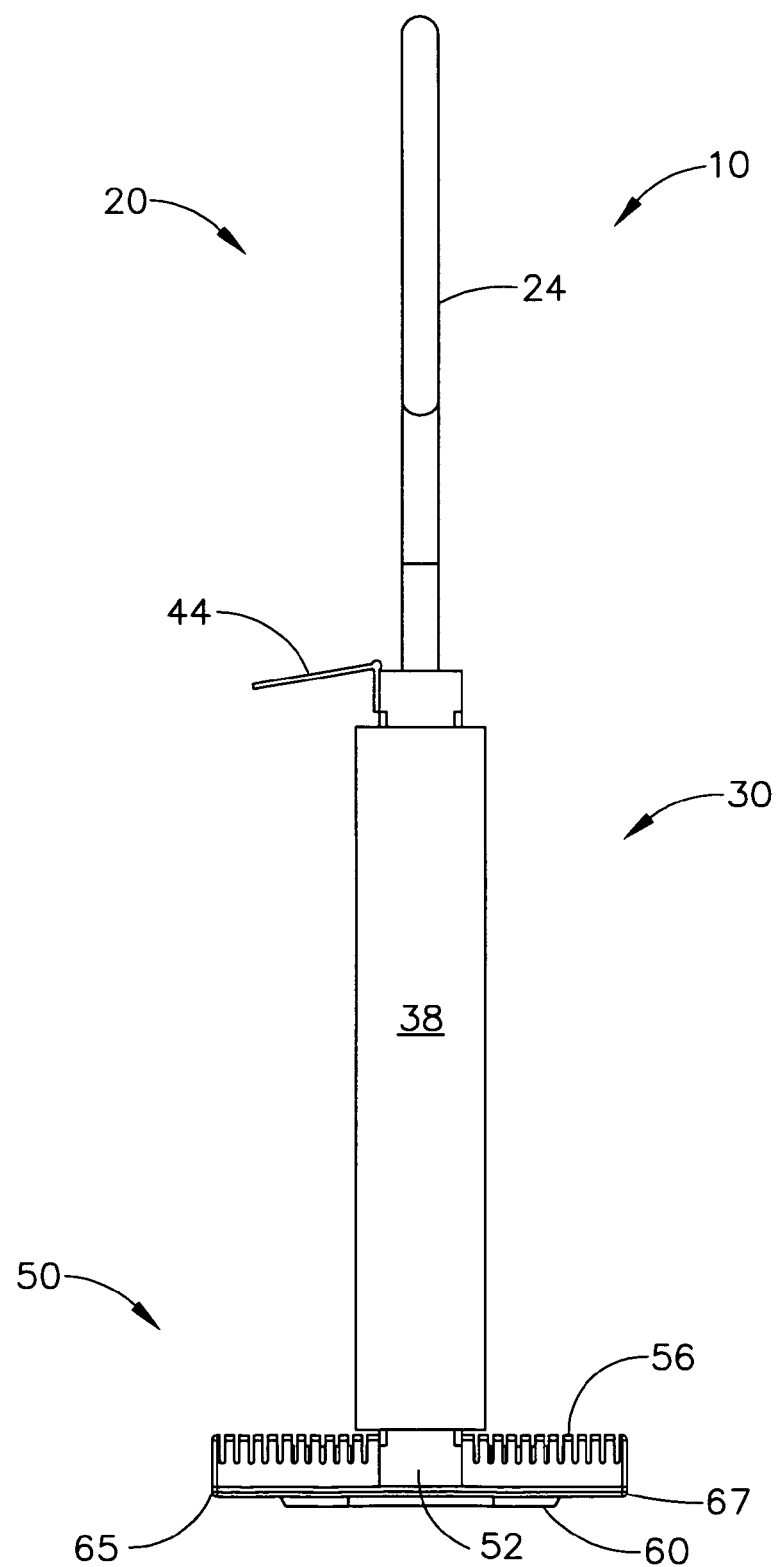
FIG. 8 is a side elevational view of the induction heating tool of FIG. 1.
Figure 9:
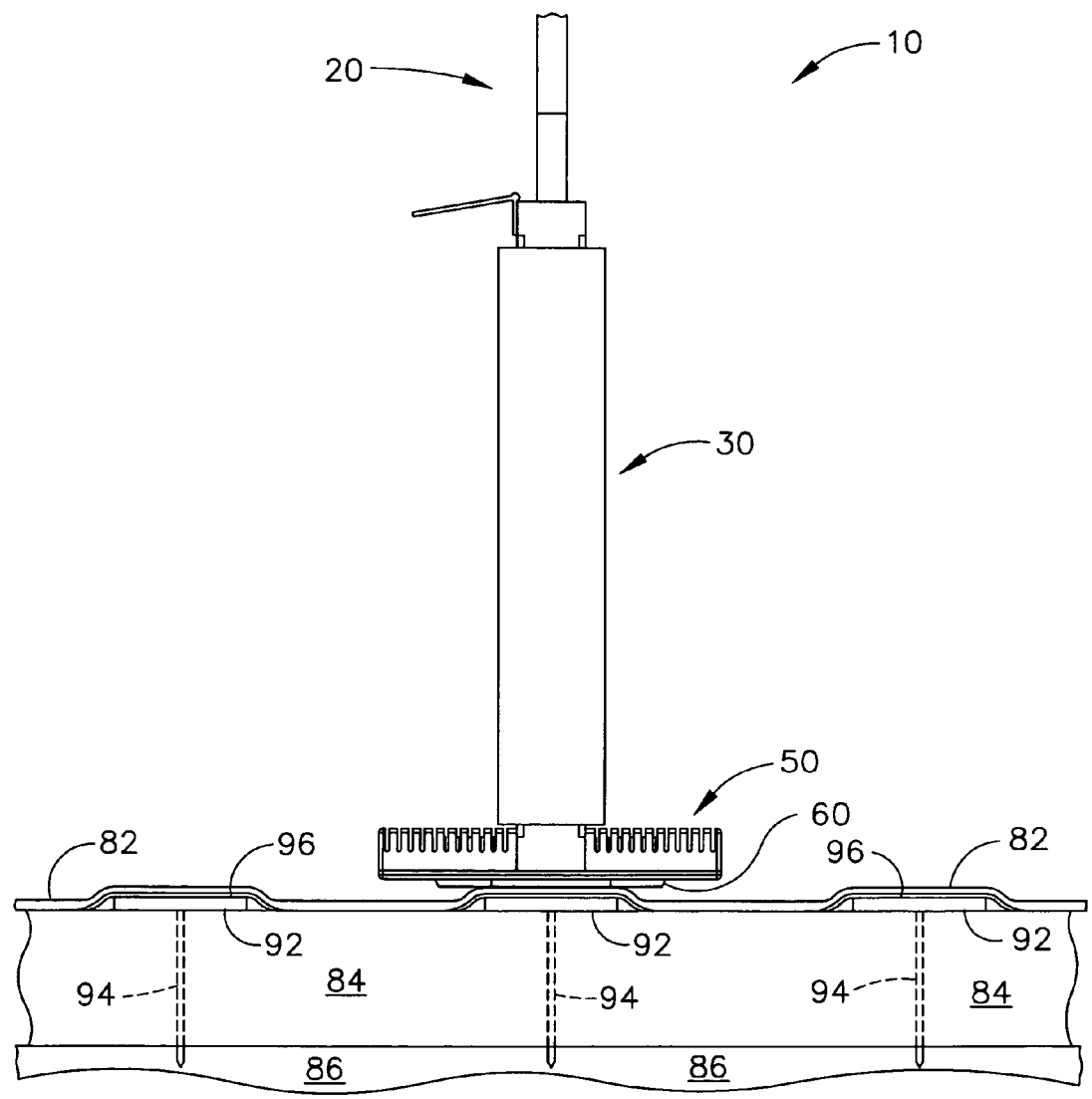
FIG. 9 is a side elevational view of the induction heating tool of FIG. 1, as used on a membrane roof that is shown in partial cross-section.

Referring now to FIG. 8, the induction heating tool 10 is illustrated in a side elevational view. In this view, the longitudinal portion of guide (or runner) 60 is seen as protruding from the bottom surface 62 of the base portion 50. Referring now to FIG. 9, the induction heating tool 10 is again illustrated in a side elevational view. In addition, some of the major elements of a membrane roof structure are depicted on FIG. 9.

In general, a membrane roof structure includes a top membrane layer 82 that may comprise some type of rubber or plastic compound. The main purpose of the membrane 82 is to prevent water from entering the building for which this roof is used. A layer of thermally insulative sheets is provided at 84, which sit upon a substrate 86. The sheets 84 are typically held to the substrate 86 by a set of attachment disks 92 which have some type of fastener 94 mounted therethrough. The attachment disk 92 could be permanently attached to its fastener 94, if desired.

In typical membrane roofs, the attachment disks 92 are circular, and have a center opening through which a relatively long screw 94 is placed. The screw is then pushed and rotated into the substrate 86, thereby holding the attachment disks in place, while also holding the insulative sheets 84 in place. In some conventional membrane roof structures, the disks 92 are coated on site with some type of liquid or gelled adhesive, and then the membrane layer is rolled over the top of them while the adhesive cures. When the adhesive cures, the membrane layer 82 becomes attached to those top surfaces of the disks. In other conventional membrane roofs, the fastener 94 is driven through the membrane layer itself, which can cause leakage problems in the top of the roof unless these structures are sealed properly.

In the present invention, the fasteners 94 are only used to run through the center opening in the attachment disk 92, and then through the thermal insulative sheets 84, and finally into the substrate 86. These fasteners 94 do not run through the top membrane layer 82. However, the membrane layer 82 must somehow be attached either to the thermally insulative sheets 84 or to the attachment disks 92. In the present invention, the attachment disks 92 are coated (usually at the factory) with a thermally-activated adhesive material. This adhesive material remains inactive until after the membrane material is rolled across the roof. The induction tool 10 is then brought in close proximity to one of the attachment disks 92, and then the tool is actuated. When that occurs, a magnetic field is emitted by the induction coil 68 (not seen on FIG. 9) which creates eddy currents in the electrically conductive portions of the disks 92.

In general, the disks 92 comprise a metallic substance (e.g., aluminum or steel), which would tend to be electrically conductive. When the eddy currents are generated, the disks 92 are raised in temperature to a point where the top adhesive 96 becomes active, and generally would melt. The adhesive 96 will then adhere to the bottom surface of the membrane layer 82. When the induction tool 10 is de-activated, the entire system cools down and the adhesive 96 remains adhered to the bottom surface of the membrane layer 82, thereby "permanently" mounting the membrane layer 82 onto the tops of the attachment disks 92.

Figure 10:
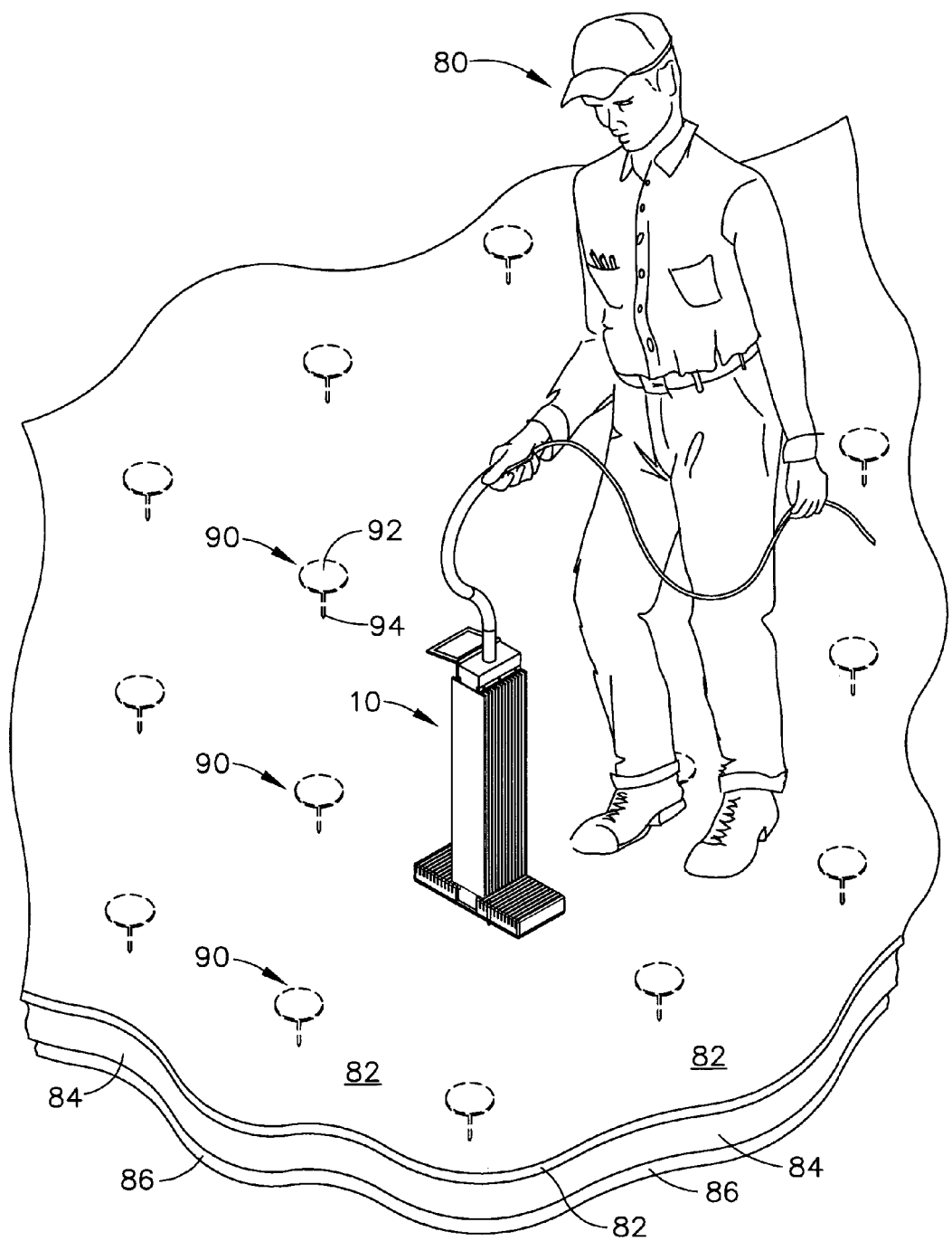
FIG. 10 is a perspective view showing a user using the induction heating tool of FIG. 1 on top of a membrane roof.

Referring now to FIG. 10, a user 80 is depicted as walking along with the induction heating tool 10, and as the user finds one of the attachment disks 92, the user will actuate the induction heating tool 10. In FIG. 10, each of the attachment disks 92 in combination with one of the fasteners 94 is generally designated by the reference numeral 90. The user 80 first needs to find the attachment structures 90, and then needs to be relatively accurate in placement of the induction heating tool 10 when attempting to activate the adhesive 96 on the top of the attachment disks 92. The present invention has two different aspects that help the user 80 locate the attachment structures 90, as described immediately below.

As depicted on FIG. 10, it can be seen that induction heating tool 10 has a base structure that is wider in one dimension than in its narrower dimension. As discussed above, the "wider" dimension is also referred to herein as the "longitudinal" dimension, while the narrower dimension is referred to herein as the "transverse" dimension. FIG. 5 illustrates an example of proportional dimensions for the base portion 50. In one exemplary embodiment, the longitudinal dimension of base portion 50 is around twelve inches in distance, and the narrower transverse dimension is around five inches in distance. The racetrack construction coil 68 is essentially oval-shaped, rather than circular-shaped (which is a typical shape for conventional induction coils that are used for membrane roofing).

For appropriate heating of one of the attachment structures 90, it is best if the base portion 50 is positioned directly over the center of the circular attachment disk 92. However, there is some tolerance with respect to how accurate the user 80 must be in positioning the induction heating tool 10 over the circular attachment disk 92. The longitudinal tolerance is actually fairly large, and can be as much as one inch in either direction (e.g., ±1 inch). A typical user will find this to be quite easily accomplished when positioning the induction heating tool 10. As can be seen in FIG. 10, this longitudinal dimension would be perceived by the user 80 as a side-to-side dimension, which means that the user 80 would perceive this as either moving the tool to the left or to the right when positioning tool 10 over one of the attachment structures 90.

However, the transverse dimension is a little bit more difficult to position, since the oval-shaped coil 68 is narrower in this transverse dimension. The relative size of the coil in the transverse direction is designed with a specific diameter in mind for the attachment disk 92, to achieve superior heating of the attachment disk 92 by the magnetic field emitted by the induction coil (or "work coil") 68. From the user's perspective, this positioning direction would be in a forward or backward direction for moving the induction heating tool 10.

The guide rail 60 is the first aspect of the present invention that aids the user 80 in positioning the tool 10 in its proper location over one of the attachment disks 92. When the user is moving the tool 10 along the top of the membrane roof, the "front" longitudinal member of guide rail will "bump" into a raised portion of the membrane roof, which means that the user has physically found one of the attachment structures 90, since it is somewhat raised above the thermally insulative sheets 84. (See FIG. 9 for this configuration.) User 80 can then either tilt the induction heating tool 10 a little to clear the front edge of the attachment disks 92, or actually lift the tool 10, if desired. Then the user 80 will move the induction heating tool 10 a little farther forward until the "rear" longitudinal member of guide rail "bumps" against the attachment disk 92. When this has occurred, induction heating tool 10 is approximately in the correct heating position.

It will be understood that the guide structure 60 could have a shape that is not necessarily oval, while still performing the function of acting as a mechanical locating device for finding the attachment disks 92. Alternatively, a square shape or a more rectangular shape could be used, or perhaps a circular shape, if desired. However, one advantage of the oval shape is that it eliminates relatively sharp corners that might snag or tear the membrane layer (as opposed to a square or rectangular shape exhibiting right angles at the corners).

In an exemplary embodiment of the induction heating tool of the present invention, the distance between the inner dimensions of the two longitudinal members of guide rail 60 is somewhat larger than the outer diameter of one of the attachment disks 92. This is to allow some extra room to allow the tool 10 to be placed over an attachment disk 92, while also allowing for the space taken by the membrane layer 82. Since there is some extra "play" between the two longitudinal members of guide rail 60, the induction heating tool 10 can still be more accurately positioned for improved heating results. This leads to the second aspect of the present invention with regard to positioning the induction heating tool 10.

Figure 11:
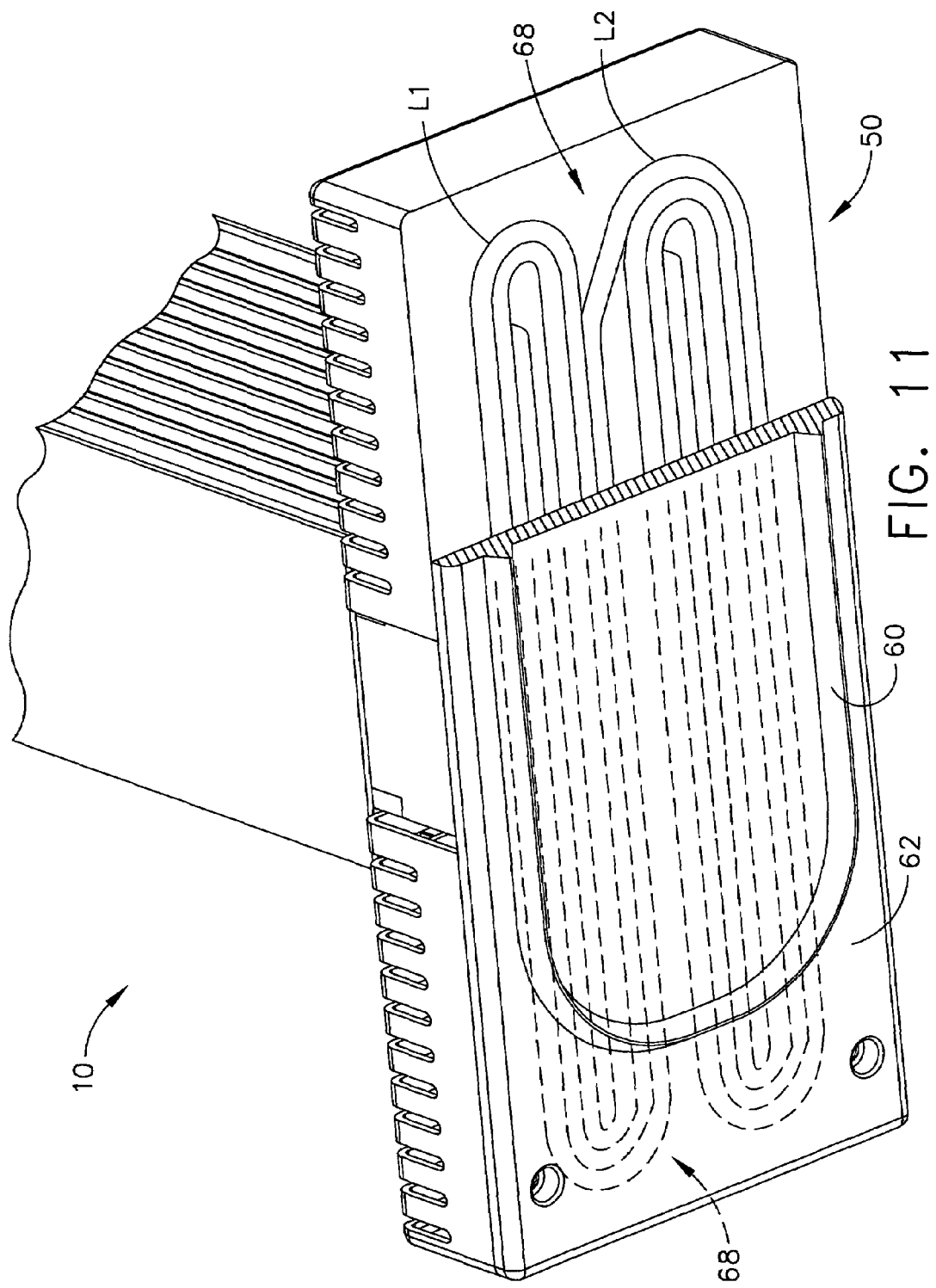
FIG. 11 is a perspective view partially cut-away from below, of the base portion of the tool of FIG. 1.

Although the mechanical guide rail 60 of the present invention allows the user 80 to physically locate the attachment structures 90 rather quickly, it may also be useful to provide a little more accurate placement of the tool 10 over the top attachment disk 92. The racetrack induction coil 68 can be constructed in two "halves," which comprise a single winding in an exemplary embodiment of the induction heating tool 10; see FIG. 11. Since optimum heating that is substantially uniform is obtained when the attachment disk 92 is exactly centered beneath the coil, and thus between the two longitudinal members of guide rail 60, the present invention has another aspect that can assist in this more exact placement. (It will be understood that the terms "exactly centered" or "exact placement" will nevertheless allow a small tolerance of "inexact" positioning, and substantially optimal heating can still occur at a "substantially" accurate position, rather than requiring a truly "exact" position or placement.)

In the present invention, the induction coil 68 can be centertapped, and the voltage flowing through each half of the coil 68 will be inductively loaded to a certain extent by its proximity to an attachment disk 92. If the induction coil is substantially or "exactly" centered over the attachment disk 92, then both halves of the centertapped induction coil 68 will be substantially equally loaded, and thus will both exhibit a substantially equal impedance. A detection circuit is provided to detect this substantial "equal" loading, and can provide an indication to the user that the induction coil 68 is thus properly positioned.

Figure 12:
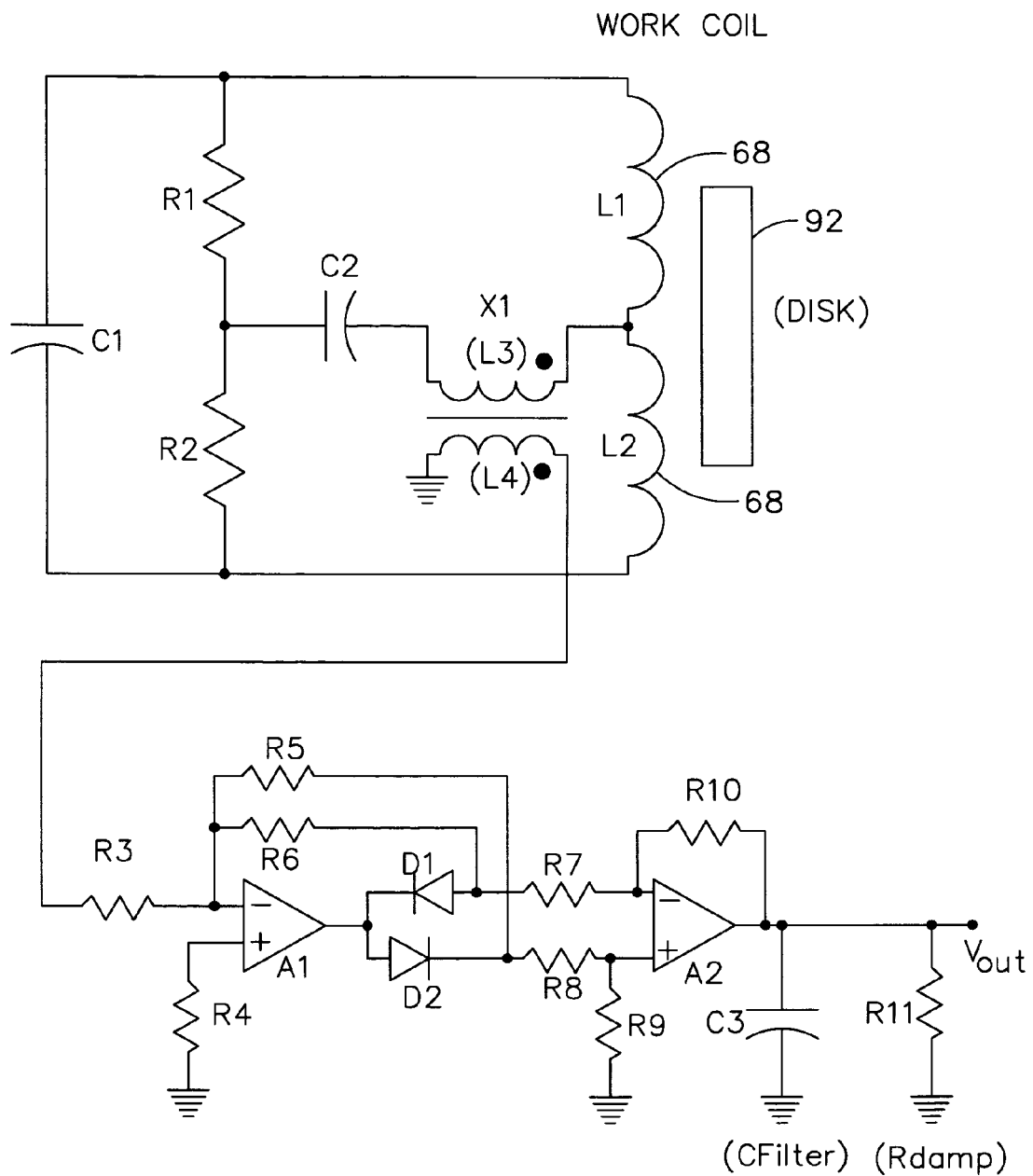
FIG. 12 is an electrical schematic diagram of a position sensing circuit used with the induction heating tool of FIG. 1.

Referring now to FIG. 12, an electrical schematic diagram illustrates some of the major components of an exemplary position detection circuit. The induction work coil 68 is illustrated as having two separate inductors L1 and L2. As noted above, in reality this coil is a single electrical winding, which receives alternating current from the power supply and drive circuit, and exchanges reactive electrical energy with a capacitor C1. In this circuit arrangement, the work coil 68 and the capacitor C1 comprise a tank circuit having a resonant frequency that allows substantially maximum output from the power supply and controller circuit (not shown on FIG. 12) to the induction coil 68. As noted above, an exemplary power supply, controller, and drive circuit are described in a commonly-assigned U.S. Pat. No. 6,509,555.

The centertap conductor for the work coil 68 is run to one of the windings of a transformer X1; this winding is referred to as L3 on FIG. 12. Winding L3 is in series with a "blocking" capacitor C2, which runs to a node that is connected to two resistors R1 and R2. In this configuration, resistors R1 and R2 can have substantially equal resistive values, and inductors L1 and L2 can have substantially equal inductive values. This circuit arrangement can be considered a Wheatstone bridge, and when this Wheatstone bridge is balanced, the current through the centertap will substantially be zero. This should occur when the attachment disk 92 is positioned substantially centered with respect to the work coil 68 (as schematically shown in FIG. 12).

On the other hand, if the attachment disk 92 is off-center, then one of the halves of the work coil 68 will be inductively loaded to a different extent than the other half, and its impedance will be greater than or less than the other half. When that occurs, the effective impedance of the two windings L1 and L2 thus will not be equal, and current will flow through the winding L3 of the transformer X1. And when that occurs, current will also flow through the other winding L4 of the same transformer X1.

Any current flowing in the winding L4 will be directed to an operational amplifier circuit, in which a first op-amp stage A1 has gain resistors R5, R6, R3, and R4. The two feedback resistors R5 and R6 are coupled to two signal diodes D1 and D2, which will tend to act as rectifiers for the AC voltages coming from the winding L4. The output signal will then be directed to a second gain amplifier stage, using an op-amp A2. The gain resistors for this second stage amplifier A2 are designated R7, R8, R9, and R10. This second stage acts as a differential amplifier, and its output voltage is run through a low-pass filter, comprised of a capacitor C3 and a resistor R11. The output voltage is designated as $V_{OUT}$. The voltage $V_{OUT}$ can then be run to an analog-to-digital converter, which can be an on-board device of a microcontroller chip, if desired.

When the Wheatstone bridge circuit of FIG. 12 is essentially nulled, then the current running through the winding L4 will be at a minimum magnitude, perhaps very close to zero amperes. When that occurs, the voltage magnitude for $V_{OUT}$ from the op-amp stage A2 substantially will be at a minimum value. This minimum value may depend on whether the op-amps A1 and A2 are connected to a single DC power supply, or to dual bi-polar power supplies. If a single power supply is used, then the minimum value for $V_{OUT}$ may not be substantially near to zero volts, but likely will be at or near a predetermined (minimal) voltage within a predetermined tolerance. A bi-polar dual power supply circuit will likely produce a near-zero voltage (within a predetermined tolerance) at $V_{OUT}$ when the current through L4 is at its minimum value. When $V_{OUT}$ is running within that predetermined tolerance (determined by using a threshold test, for example), then the microcontroller will determine that the disk 92 has been found and substantially centered, and can provide an indication to the user 80 that the heating event can now occur properly. The indicator, for example, could be audio, visual, or tactile, such as a vibration device.

If a visual indicator device is used, for example, a light emitting diode (LED) could be provided on the handle portion 20. The LED could be energized (and illuminate) to let the user know that the attachment disk is substantially centered, and thus it is appropriate to start a "heating event." If the LED is not illuminated, then this indicates to the user that he or she needs to move the induction heating tool a bit further forward or a bit rearward.

If a vibrational device is used, for example, then some type of buzzer could be provided in the handle portion 20, and the user 80 could feel a vibration in his or her hand produced by the buzzer as an indication that it is appropriate to now start a heating event. An audio indicator could also be provided, such as a Sonalert™ or some type of piezoelectric element. Of course, other types of indicating devices could be used without departing from the principles of the present invention.

To use the induction heating tool 10 in the manner described above for "fine" positioning of the work coil over an attachment disk, the user could initially actuate the switch 26 such that the work coil 68 will be driven at a "low" energy level, sufficient to only "partially" drive the magnetic field toward the attachment disk 92. This relatively low energy mode is mainly used to provide inductive feedback from the attachment disk 92 back to the work coil 68, and thereby inductively load the two windings L1 and L2 of the work coil 68. In essence, this provides the Wheatstone bridge circuit with the information it needs to determine whether or not the user presently has the work coil 68 in a correct location for a heating event to commence. In other words, the Wheatstone bridge circuit will detect the imbalance in impedance, if it exists, of the L1 and L2 inductive portions of the work coil 68. If the imbalance is sufficiently small (i.e., within a predetermined tolerance, for example), or if there is no measurable imbalance even though the work coil is being inductively loaded by the proximity of an attachment disk, then the controller can activate the indicator device. When that happens, the user could either actuate a second switch on the handle portion 20, or further push in a two-position single switch 26; or the controller device of the induction tool's electrical circuit could have its own detection intelligence to determine that the operator wishes the heating event to occur automatically once the work coil has been properly positioned. Any of these situations could be easily built into the present invention, perhaps by providing only a single mode per individual heating tool 10, or perhaps all the possible modes might be provided in one tool and the user can select which mode shall be utilized in the single heating tool 10.

In one exemplary embodiment of the induction heating tool of the present invention, a preregulator circuit will ramp the buck output voltage to about fifty volts DC, to power an output oscillator which drives the work coil 68. In this mode, the magnetic field being emitted by the work coil 68 is at the reduced "low energy" state, so inductive heating would be minimal. The microprocessor or microcontroller will sense the output of the rectified and filtered sense signal that is referred to above as $V_{OUT}$ on FIG. 12. During this stage of the operation, the induction heating tool 10 can be moved slowly forward and backward until the $V_{OUT}$ voltage becomes substantially zero or becomes within a predetermined range, as discussed above. When that occurs, the controller will activate the indicating device (i.e., a visual or a tactile feedback, for example), which indicates that the $V_{OUT}$ voltage is at an appropriate magnitude, so that the user can be assured that the induction heating (work) coil 68 has substantially become centered over the attachment disk 92. When that occurs, the user can actuate the tool to appropriately heat the attachment disk 92. The indication step can be done in one of the modes described above.

Another way to describe the electrical locator circuit is to note that the effective impedance of each "coil-half" will depend on the proximity of the attachment disk 92. If the disk 92 is exactly centered beneath the coil 68, then each "coil-half," referred to on FIG. 12 as inductors L1 and L2, will substantially be equally loaded by the disk 92, and each inductor L1 and L2 will thereby exhibit substantially the same impedance. In that state, the Wheatstone bridge circuit of FIG. 12 will be effectively nulled, and substantially zero current will flow through the winding L3 of the transformer X1, and the current in the other winding L4 of transformer X1 will also have substantially zero current flowing therethrough.

On the other hand, if attachment disk 92 is in relatively close proximity to the base portion 50, but is not exactly centered beneath the work coil 68, then one of the inductors L1 or L2 will have a greater effective impedance than the other. In general, the inductor that is "covered" to a greater extent by the disk 92 (i.e., the inductor that has "more" of the disk 92 proximal to it) will be more greatly loaded, and its effective impedance will become less than the other of these inductors L1 and L2. In this state, the Wheatstone bridge circuit will not be nulled, and current will flow through the winding L3 of transformer X1, and in turn, in winding L4 of transformer X1.

The amplifier portion of the circuit of FIG. 12 will receive this current flow from winding L4, and the output voltage at the op-amp stage A1 will increase. Accordingly, the output voltage at the op-amp stage A2 will also increase (which is the voltage $V_{OUT}$), which the microcontroller will interpret as being "outside" the appropriate heating location for the base portion 50 of tool 10, with respect to its position near the attachment disk 92.

When the base portion 50 of tool 10 is at (or near) the center of a disk 92, then the voltage magnitude for $V_{OUT}$ will be at (or near) a minimum value, which the microcontroller will interpret as being within an appropriate heating location for the base portion 50 of tool 10 (i.e., with respect to its position near the attachment disk 92). In an exemplary embodiment, a certain tolerance will be allowed as part of a threshold test, when inspecting or sampling actual voltage magnitude of $V_{OUT}$ (i.e., while looking for the actual minimum voltage magnitude). This threshold test could involve a predetermined "static" value, if desired, or it could be a dynamic value that is determined or modified by the microcontroller during run time (i.e., during actual operation of the tool 10). Certainly variations of this circuit and its operating logic could be utilized while remaining within the teachings of the present invention.

In summary, the present invention essentially provides a "gross locator" by use of the guide rails which are mechanical protrusions from the bottom base structure of the tool; the present invention also provides a "fine locator" by the center-tapped work coil and Wheatstone bridge differential voltage detection circuit, along with an appropriate indicator device to let the user know that the heating event can now appropriately occur. While it may be preferred to use both the fine locator and gross locator aspects of the present invention, it will be understood that an induction heating tool can be provided with only one of these locator devices, if desired. Certainly a user could become adept that using strictly the mechanical guide feature for the "gross locator" by practice, or by moving the inner dimensions of the guide rail somewhat closer together so that there will be a somewhat less play involved when the guide rail is moved to a location over the position of one of the attachment disks 92. In addition, the electrical circuit that detects the position of the disk could be provided alone, without the mechanical guide rail, if desired. Therefore, both of these aspects of the present invention can be used alone, or in combination with one another, without departing from the principles of the present invention.

One important aspect of the present invention is the fact that the user 80 can use the induction heating tool 10 while always remaining in a standing position. Some of the conventional induction heaters used for membrane roofing had small location indicators that required the user to be in a kneeling position to see the indicators while attempting to correctly position the tool over one of the attachment disks. The present invention eliminates this awkward mode of operation, by allowing the user to quickly move the tool along the top of the membrane roof and mechanically locate the attachment disk. Once the attachment disk has been located, the user then lifts or tilts the tool so that the mechanical positioning guide will fit over the leading edge of the attachment disk, and then the tool can be further slid along the membrane until the work coil is essentially directly above the circular attachment disk. If a more fine positioning is desirable, then the electrical positioning sensor and indicator can then be utilized by the user. In all cases, the user never needs to leave the standing or walking upright position.

Another aspect of the present invention is that the work coil is suitably cooled by heat sinks that are directly attached to the base portion of the tool. This is an improvement over some of the conventional tools that required water cooling or forced air cooling. While certain aspects of the present invention could be used with a liquid cooled or an air cooled induction coil, in an exemplary embodiment of the present invention there are no liquid cooling pipes or tubes, and there is no fan or other type of forced-air cooling.

The induction (work) coil 68 of the present invention can be constructed in a "racetrack" configuration, as discussed above; one refinement is to use a "double racetrack" configuration for this induction coil. An example of such an induction coil is described and illustrated in a co-assigned published patent application, US 2004/0048537 A1; see FIG. 4, in which the coil is generally designated by the reference numeral 20, and the double racetrack comprises two elliptical coil elements 21. The coil 68 illustrated on FIG. 11 for the present invention is an example of this double racetrack design, and the two coil elements generally correspond to inductor windings L1 and L2 on the schematic diagram of FIG. 12.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. An induction heating apparatus, comprising:
   (a) a lower base portion, (b) an upper handle portion, and (c) a body portion located therehetween;
   (d) an electrical power supply and a controller;
   (e) a manually-operable actuation device located in said handle portion;
   (f) an induction coil located in said base portion; and
   (g) a plurality of heat sink elements located on a surface of said base portion;
   wherein said base portion includes a base portion housing that covers said plurality of heat sink elements, wherein said base portion housing has a plurality of slots to allow ambient air to flow to said plurality of heat sink elements.

2. The induction heating apparatus as recited in claim 1, further comprising a body portion housing that covers said electrical power supply and said controller, wherein said body portion housing has a plurality of slots to allow ambient air to flow to said electrical power supply and said controller.

3. The induction heating apparatus as recited in claim 1, further comprising a second plurality of heat sink elements tat are located on a surface of said body portion.

4. The induction heating apparatus as recited in claim 1, wherein when said manually-operable actuation device is operated by a user, said induction coil emits a magnetic field that induces eddy currents in an electrically conductive portion of a susceptor.

5. The induction heating apparatus as recited in claim 4, wherein said susceptor comprises an attachment member used in a membrane roof structure.

6. The induction heating apparatus as recited in claim 5, further comprising; a mechanical guide structure located along a bottom surface of said base portion, said mechanical guide structure being of a size and shape to assist in positioning said induction heating apparatus proximal to said attachment member.

7. An induction heating apparatus, comprising:
(a) a lower base portion tat is elongated in a first direction, (b) an upper handle portion, and (c) a body portion located therebetween, said body portion being elongated in a second direction that is substantially perpendicular to said first direction;
(d) an electrical power supply and a controller;
(e) a manually-operable actuation device located in said handle portion;
(f) an induction coil located in said base portion; and
(g) a plurality of heat sink elements located on a surface of said base portion. wherein:
(h) said body portion is longer in said first direction than said lower base portion is in said second direction; and
(i) when said induction heating apparatus is in use, said upper handle portion in combination with said body portion extend upwardly such that said induction heating apparatus is readily operable by a human user while remaining in a standing position.

8. The induction beating apparatus as recited in claim 7 wherein, when said induction heating apparatus is in use, said lower base portion and said body portion form an inverted T-shape when viewed from a front, horizontal direction.

9. The induction heating apparatus as recited in claim 7, wherein:
(a) said lower base portion exhibits a flattened lower surface and said lower surface is proximal to said induction coil; and
(b) said plurality of heat sink elements are located on an upper surfaces of said base portion.

10. The induction heating apparatus as recited in claim 7, further comprising a base portion housing that covers said plurality of heat sink elements, wherein said base portion housing has a plurality of slots to allow ambient air to flow to said plurality of heat sink elements.

11. The induction heating apparatus as recited in claim 7, wherein when said manually-operable actuation device is operated by a user, said induction coil emits a magnetic field that induces eddy currents in an electrically conductive portion of a susceptor.

12. The induction heating apparatus as recited in claim 11, wherein said susceptor comprises an attachment member used in a membrane roof structure.

13. The induction heating apparatus as recited in claim 11, further comprising: a mechanical guide structure located along a bottom surface of said base portion, said mechanical guide structure being of a size and shape to assist in positioning said induction heating apparatus proximal to said attachment member.

* * * * *

UNITED STATES PATENT AND TRADEMARK OFFICE
CERTIFICATE OF CORRECTION

PATENT NO. : 7,399,949 B2  Page 1 of 1
APPLICATION NO. : 11/093767
DATED : July 15, 2008
INVENTOR(S) : Barber et al.

It is certified that error appears in the above-identified patent and that said Letters Patent is hereby corrected as shown below:

In claim 1, column 12, line 46, delete "therehetween" and insert -- therebetween --.

In claim 3, column 12, line 64, delete "tat" and insert -- that --.

In claim 7, column 13, line 14, delete "tat" and insert -- that --.

In claim 9, column 14, line 11, delete "surfaces" and insert -- surface --.

Signed and Sealed this

Thirtieth Day of September, 2008

JON W. DUDAS
*Director of the United States Patent and Trademark Office*